Jan. 27, 1959

L. W. SCHREINER 2,871,359

TUNABLE END-LOAD LINES WITH SCREW ADJUSTMENT FOR TRACKING TUNING CAPACITORS

Filed May 27, 1955

INVENTOR
LOUIS W. SCHREINER
BY Elmer J. Gorn
ATTORNEY

United States Patent Office 2,871,359

Patented Jan. 27, 1959

2,871,359

TUNABLE END-LOAD LINES WITH SCREW ADJUSTMENT FOR TRACKING TUNING CAPACITORS

Louis W. Schreiner, Park Ridge, Ill., assignor to Raytheon Manufacturing Company, Waltham, Mass., a corporation of Delaware Application May 27, 1955, Serial No. 511,700

4 Claims. (Cl. 250—40)

This invention relates generally to electrical resonant circuit tuning devices and, more particularly, to a tuner which operates over a wide range of frequencies in the ultra-high frequency band.

The increased use of radio waves for providing communications of various types including radar and television has made it necessary to utilize higher frequencies than have been heretofore used. Most prior operations in the ultra-high frequency band have been at a fixed frequency, and it has therefore not been necessary to provide tuning units which are operable over a range of frequencies.

A large number of channels in the ultra-high frequency band have now been assigned for television use, and it is therefore desirable to provide a tuner which will operate in this band and function to select any desired channel. The tuners which have been proposed for this use have been of a relatively complicated nature and, as a result, have been quite expensive in construction. This has been caused in a large measure by the fact that the values of capacitance and inductance required are quite small, and the components therefore critical. Another problem has been to provide the wide range of frequencies required. The use of switching means to provide a wide range, as has been done in the past, is objectionable since any available switching means introduces capacity and/or inductance into the circuit, which is substantial compared to the values of the components of the tuner.

Accordingly, the present invention is directed toward a novel tunable resonant structure in which a capacitively tuned transmission line is provided with adjusting screws to change the frequency versus dial rotation characteristic, thus allowing two tuned circuits to be tracked to each other or to an oscillator circuit. The resonant structure comprises a rotor composed of butterfly-shaped vanes insulated from a shaft for controlling the variable capacity of the end of the transmission line, the capacity being controlled from the transmission line center conductor to the rotor, and from the rotor to ground. A plurality of tracking screws are included in the end of the tuner whereby the ground capacity may be adjusted to a desired value for any particular position of the butterfly rotor. Rotation of the vanes will then give the tuning required. Since the rotor is floating, the use of objectionable sliding contacts is eliminated, a highly desirable advantage in view of the fact that such contacts are a source of erratic operation in ultra-high frequency circuits.

The invention will be better understood as the following description proceeds taken in conjunction with the accompanying drawing wherein.

Figure 1:
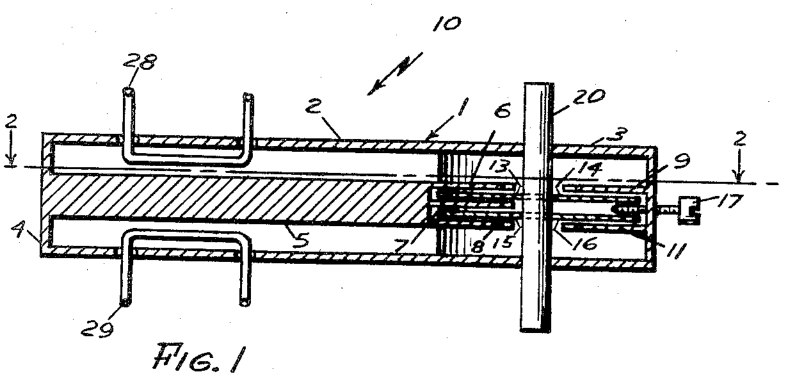
Fig. 1 is a sectional side view of the tuning structure in accordance with the invention taken along line 2—2 of Fig. 2.
Figure 2:
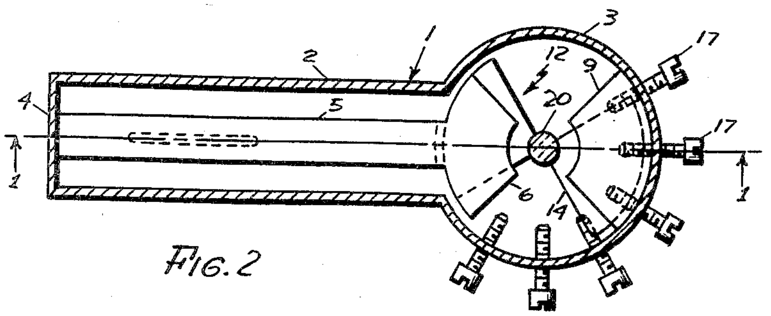
Fig. 2 is a sectional plan view of the structure of Fig. 1 taken along the line 1—1.
Figure 3:
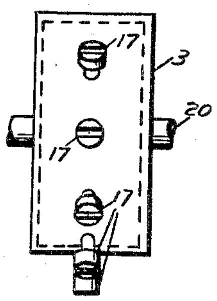
Fig. 3 is an end view of the structure of Fig. 1.

Referring now to the drawing, and more particularly to Figs. 1 and 2 thereof, there is shown generally at 10 a tunable resonant structure comprising a suitable hollow outer conductor 1 which may be silver-plated brass, for example, and having in the preferred form a rectangular portion 2 and a circular end portion 3. Attached to end plate 4 of the rectangular portion 2 is an inner conductor 5 whereby outer conductor 1 and inner conductor 5 in effect form a coaxial transmission line. The free end of inner conductor 5 has associated therewith a plurality of spaced, stationary, fan-shaped conducting plates 6, 7, and 8, which may be made integral with conductor 5 or attached thereto in any suitable manner as by soldering. The inner surface of the circular portion 3 of outer conductor 1 is likewise provided with a plurality of stationary plates 9 and 11 similar in conformation to those attached to the free end of inner conductor 5.

Disposed in the circular portion 3 is a floating rotor structure 12 comprising an insulating shaft 20 having secured thereto a plurality of butterfly vanes 13, 14, 15, and 16. Vanes 13 and 15 engage the space between stationary plates 6 and 7, and 7 and 8, respectively, thereby providing a variable capacitance between one end of conductor 5 and the rotor structure 12. In a similar manner, vanes 14 and 16 engage the space between plate 9 and one side of one or more of a plurality of tracking screws 17, and between plate 11 and the other side of screws 17, respectively. It can thus be seen that a capacitance will also exist between rotor 12 and the outer conductor 1, which is dependent upon how far screws 17 protrude into the space between vanes 14 and 16, as well as on the angular position of the rotatable vanes 14 and 16 in relation to stationary plates 9 and 11. This second value of capacitance will be in series with the value of capacitance which exists between the end of inner conductor 5 and rotor structure 12 for any given angular position of the rotor. The electrical characteristics of the resonant structure may then be changed to tune to a desired frequency by adjusting screws 17 to the desired degree, thus varying the capacity between the rotor structure and outer conductor 1. After screws 17 have been adjusted, rotation of shaft 20 will afford selection of any frequency to which it is desired to tune the resonant structure 10. Although only six tracking screws have been shown, it should be understood that finer adjustment may be made by adding as many screws as necessary for the degree of accuracy of tracking desired.

Figure 4:
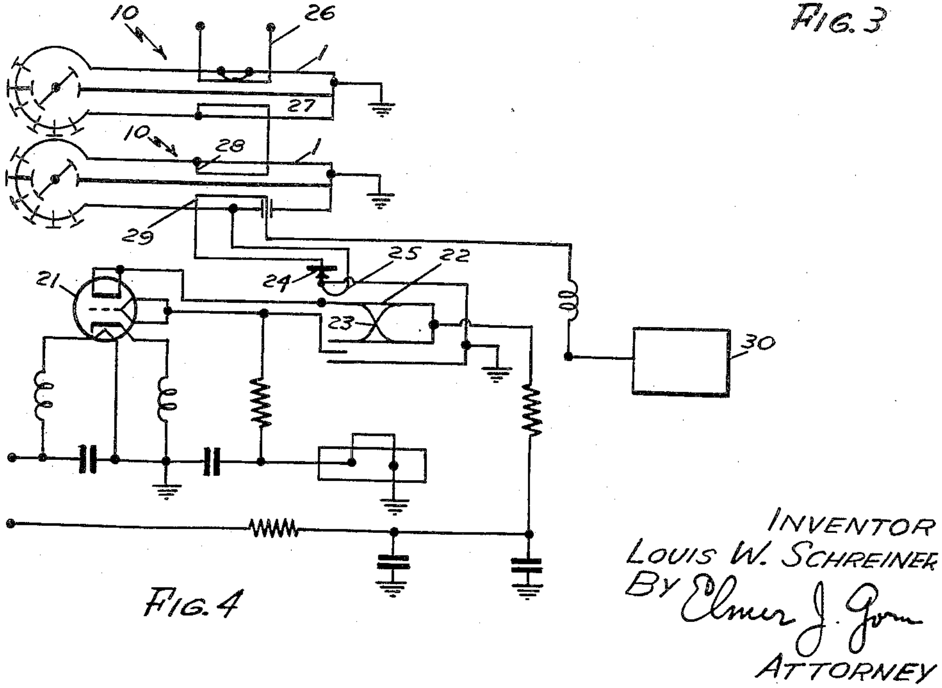
Fig. 4 is a schematic diagram of a circuit incorporating the tuning element of the invention.

Referring now to Fig. 4, there is shown a preferred ultra-high radio frequency circuit utilizing the novel tunable resonant structure of the present invention. A conventional oscillator circuit 21 is provided having the output frequency controlled by the tuning of a transmission line 22. The electrical characteristic length of the transmission line 22 is controlled by a movable shorting bar 23. The output frequency from the oscillator circuit 21 is received by a mixing circuit comprising a crystal 24 through a coupling loop 25.

An antenna 26 receives transmitted ultra-high radio frequency signals. Antenna 26 is connected to the outer conductor 1 of one tunable resonant structure 10, which is coupled to a second tunable structure through coupling loops 27 and 28. A coupling loop 29 interconnects the second resonant structure and crystal 24. The crystal 24 mixes the selected ultra-high radio frequency signals and the oscillator frequency to provide an intermediate frequency signal, which is fed to intermediate frequency stage 30.

Although there has been shown what are considered to be preferred embodiments of the present invention, various adaptations and modifications thereof may be made without departing from the spirit and scope of the invention as defined in the appended claims.

What is claimed is:

1. In combination, a tunable resonant structure comprising an outer conductor, an inner conductor, said inner conductor having a plurality of spaced plates at one end thereof and said outer conductor having a plurality of spaced plates attached to an inner surface thereof, a rotor mounted on an insulated shaft and having a plurality of vanes adapted to engage the space between said plates of said inner and outer conductors, and a plurality of screws piercing the surface of said outer conductor and extending into said resonant structure, certain of said screws engaging a space between said outer conductor plates and adapted to be included in a space between said vanes when said vanes move into said space between said outer conductor plates whereby the electrical characteristics between said inner and outer conductors may be varied, the remaining of said screws being disposed out of said space between said outer conductor plates.

2. In combination, a tunable resonant structure comprising an outer conductor, an inner conductor, said inner conductor having a plurality of spaced plates at one end thereof and said outer conductor having a plurality of spaced plates attached to an inner surface thereof, a rotor comprising an insulating shaft having a plurality of vanes thereon adapted to engage the space between said plates of said inner and outer conductors, and a plurality of screws piercing the surface of said outer conductor and extending into said resonant structure, certain of said screws engaging a space between said outer conductor plates and adapted to be included in a space between said vanes when said vanes move into said space between said outer conductor plates whereby the electrical characteristics between said inner and outer conductors may be varied, the remaining of said screws being disposed out of said space between said outer conductor plates.

3. In combination, a tunable resonant structure comprising an outer conductor, an inner conductor, said inner conductor having a plurality of spaced plates at one end thereof and said outer conductor having a plurality of spaced plates attached to an inner surface thereof, a rotor mounted on an insulated shaft and having a plurality of vanes adapted to engage the space between said plates of said inner and outer conductors, and a plurality of screws piercing the surface of said outer conductor and extending into said resonant structure, certain of said screws engaging a space between said outer conductor plates and adapted to be included in a space between said vanes when said vanes move into said space between said outer conductor plates whereby the electrical characteristics between said inner and outer conductors may be varied, the remaining of said screws being disposed out of said space between said outer conductor plates along a path to be included in a space between said vanes when said vanes move out of said space between said outer conductor plates.

4. In combination, a tunable resonant structure comprising an outer conductor, an inner conductor, said inner conductor having a plurality of spaced plates at one end thereof and said outer conductor having a plurality of spaced plates attached to an inner surface thereof, a rotor comprising an insulating shaft having a plurality of vanes thereon adapted to engage the space between said plates of said inner and outer conductors, and a plurality of screws piercing the surface of said outer conductor and extending into said resonant structure, certain of said screws engaging a space between said outer conductor plates and adapted to be included in a space between said vanes when said vanes move into said space between said outer conductor plates whereby the electrical characteristics between said inner and outer conductors may be varied, the remaining of said screws being disposed out of said space between said outer conductor plates along a path to be included in a space between said vanes when said vanes move out of said space between said outer conductor plates.

References Cited in the file of this patent

UNITED STATES PATENTS

| | | |
|---|---|---|
| 2,097,519 | Gabriel et al. | Nov. 2, 1937 |
| 2,303,388 | Pray | Dec. 1, 1942 |
| 2,306,333 | Conron et al. | Dec. 22, 1942 |
| 2,309,455 | Herzog | Jan. 2, 1943 |
| 2,367,681 | Karplus et al. | Jan. 23, 1945 |
| 2,408,410 | Clark | Oct. 1, 1946 |
| 2,413,836 | Larson | Jan. 7, 1947 |
| 2,558,463 | Reed | June 26, 1951 |
| 2,571,026 | Fruithof | Oct. 9, 1951 |
| 2,583,027 | Taylor | Jan. 22, 1952 |
| 2,656,517 | Johnson | Oct. 20, 1953 |